(12) United States Patent
Rock

(10) Patent No.: US 7,186,476 B2
(45) Date of Patent: Mar. 6, 2007

(54) ONE PIECE BIPOLAR PLATE WITH SPRING SEALS

(75) Inventor: Jeffrey A Rock, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 354 days.

(21) Appl. No.: 10/703,237

(22) Filed: Nov. 7, 2003

(65) Prior Publication Data

US 2005/0100775 A1    May 12, 2005

(51) Int. Cl.
H01M 8/04 (2006.01)
H01M 8/10 (2006.01)

(52) U.S. Cl. ............. 429/39; 429/32; 429/35; 429/38

(58) Field of Classification Search ............. None
See application file for complete search history.

(56) References Cited

U.S. PATENT DOCUMENTS

| | | | |
|---|---|---|---|
| 6,051,331 A * | 4/2000 | Spear et al. ......... | 429/34 |
| 6,503,653 B2 * | 1/2003 | Rock ........... | 429/35 |
| 6,599,653 B1 * | 7/2003 | Cummins et al. ........ | 429/35 |
| 6,833,210 B2 * | 12/2004 | Kikuchi et al. ........ | 429/26 |
| 2002/0127461 A1 | 9/2002 | Sugita et al. | |

* cited by examiner

Primary Examiner—John S. Maples
(74) Attorney, Agent, or Firm—Harness Dickey & Pierce, P.L.C.

(57) ABSTRACT

A PEM fuel cell includes a cathode plate for directing a first fluid along a surface thereof. An anode plate directs a second fluid along a surface thereof. An MEA is oriented in a first direction. The MEA includes an anode face opposing the anode plate and a cathode face opposing the cathode plate. A plate margin includes first and second header apertures oriented in a second direction perpendicular to the first direction. A first seal is disposed between the anode plate and the MEA. The first seal defines a first fluid communication path between the first header aperture and the anode plate. A second seal is disposed between the cathode plate and the MEA. The second seal defines a second fluid communication path between the second header aperture and the cathode plate. The first and second seals allow the first and second fluid to flow through respective passages thereon in a direction parallel the first direction.

16 Claims, 6 Drawing Sheets

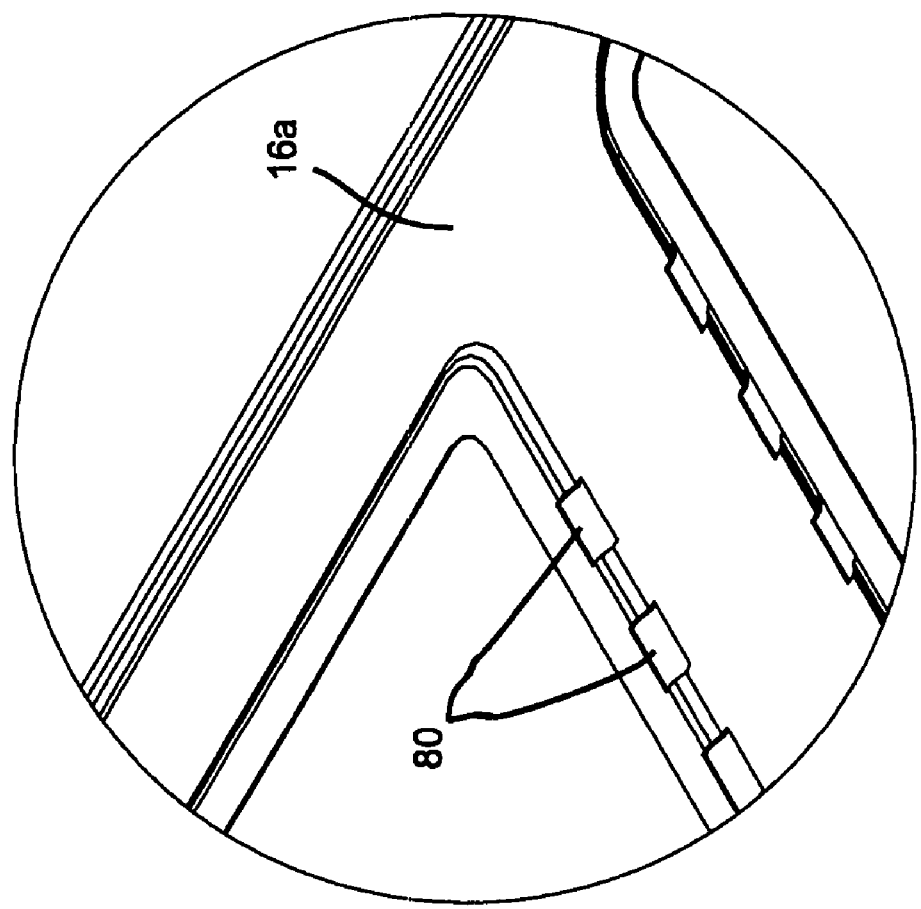

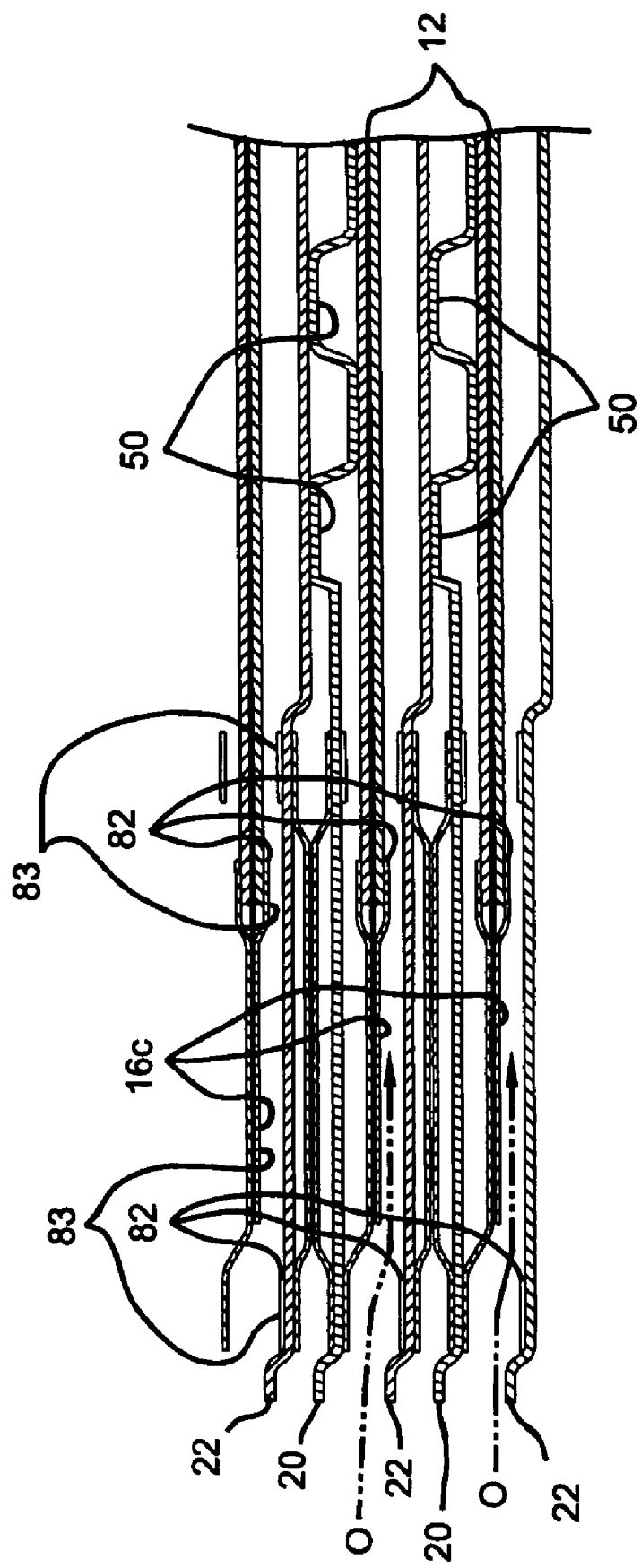

ONE PIECE BIPOLAR PLATE WITH SPRING SEALS

FIELD OF THE INVENTION

The present invention relates to PEM fuel cells and more particularly to a seal configuration incorporated within a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Typically, nonconductive gaskets or seals provide a seal and electrical insulation between the several plates of the fuel stack. In addition, the seals provide a flow path for the gaseous reactants from the supply header to the surfaces of the respective anode and cathode catalysts. Conventionally, the seals comprise a molded compliant material such as rubber. Because the seals are made of compliant material and have a narrow wall thickness, handling them during the assembly process can be difficult. In addition, curing time must be accounted for with molded seals prior to installation. Molded rubber seals also present difficulty when arranging holes for flow passages thereon.

SUMMARY OF THE INVENTION

A PEM fuel cell according to the present invention includes a cathode plate for directing a first fluid along a surface thereof. An anode plate directs a second fluid along a surface thereof. An MEA is oriented in a first direction. The MEA includes an anode face opposing the anode plate and a cathode face opposing the cathode plate. A plate margin includes first and second header apertures oriented in a second direction perpendicular to the first direction. A first seal is disposed between the anode plate and the MEA. The first seal defines a first fluid communication path between the first header aperture and the anode plate. A second seal is disposed between the cathode plate and the MEA. The second seal defines a second fluid communication path between the second header aperture and the cathode plate. The first and second seals allow the first and second fluid to flow through respective passages thereon in a direction parallel the first direction.

A seal arrangement for directing fluid flow from a header of a PEM fuel cell to an appropriate MEA face according to the invention is provided. The MEA is bounded between an anode and cathode plate. The seal arrangement includes a first seal disposed between the anode plate and the MEA. The first seal defines a first fluid communication path between a first fluid supply aperture in the header and the anode plate. A second seal is disposed between the cathode plate and the MEA. The second seal defines a second fluid communication path between a second fluid supply aperture in the header and the cathode plate. The first and second seals allow the first and second fluid to flow through respective passages thereon in a direction parallel to the MEA.

A PEM fuel cell according to the present invention includes a separator plate for directing a first fluid along a first surface thereof and a second fluid along an opposite second surface thereof. A first MEA is oriented in a first direction. The first MEA includes an anode face opposing the first surface of the separator plate. A plate margin includes a first header aperture oriented in a second direction, the second direction perpendicular to the first direction. A first seal is disposed between the separator plate and the first MEA, the first seal defines a first fluid communication path between the first header aperture and the first surface of the separator plate. The first seal allows the first fluid to flow through a passage therethrough in a direction parallel to the first direction.

A method of making a seal for implementation with a fuel cell stack according to the invention is provided. A metallic sheet defining a plane is provided. Apertures are arranged in a first direction perpendicular to the plane at predetermined locations on the metallic sheet. Portions of the metallic sheet are offset whereby passages are revealed through the apertures defining flow passages for reactant fluid of the fuel cell stack. The passages are oriented parallel to the plane.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3a is a detailed view of area 3a of FIG. 3;

FIG. 4 is a cross section of the PEM fuel stack taken along line 4—4 of FIG. 1 showing the cathode porting.

DETAILED DESCRIPTION OF THE PREFERRED EMBODIMENTS

The following description of the preferred embodiment(s) is merely exemplary in nature and is in no way intended to limit the invention, its application, or uses.

Figure 1:
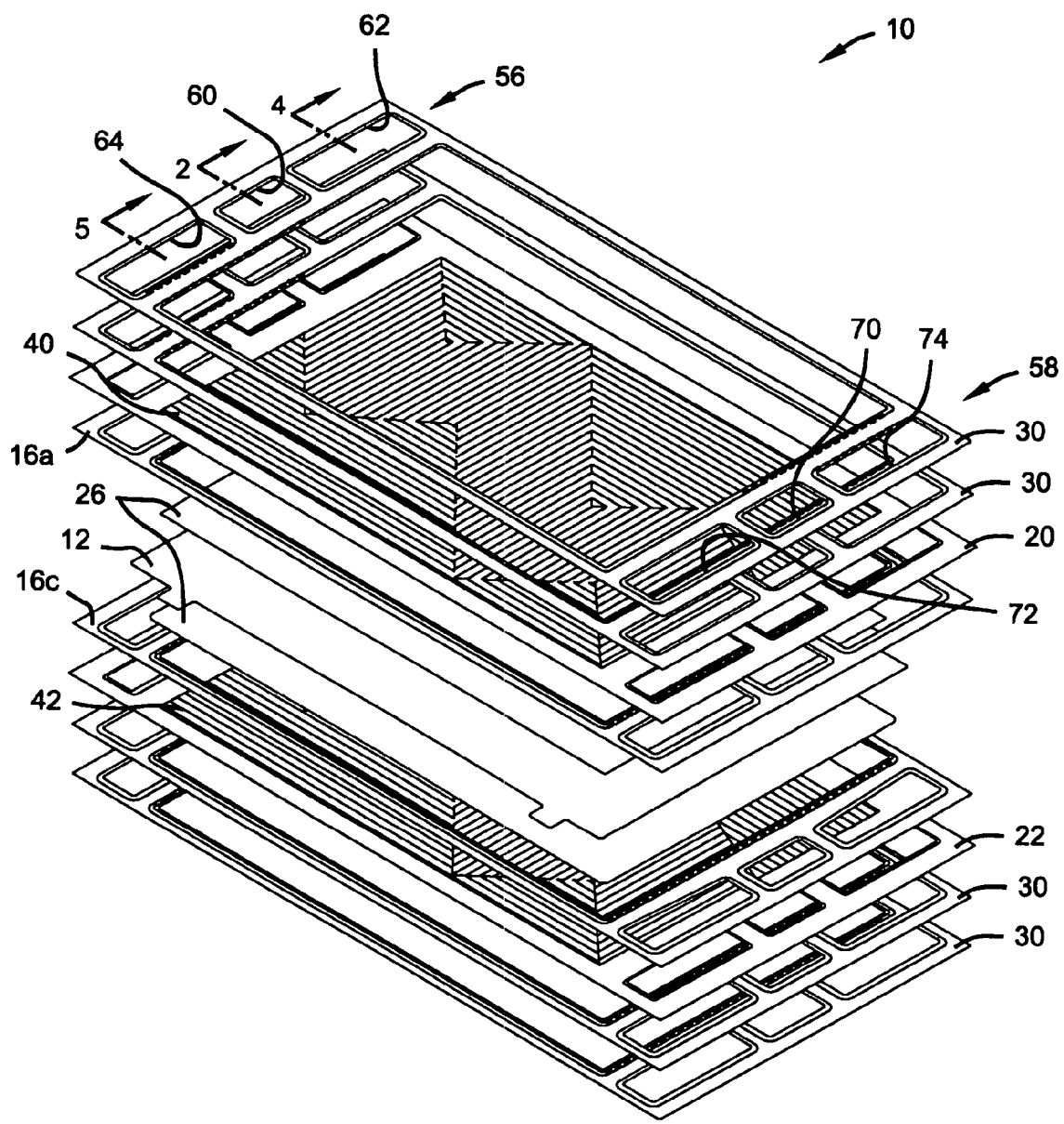
FIG. 1 is an isometric exploded view of a fuel cell including a pair of complementary spring seals in a PEM fuel cell stack.

FIG. 1 schematically depicts a partial PEM fuel cell stack 10 having a membrane-electrode-assemblies (MEAs) 12 bounded on each side by complementary spring seals or plates 16a and 16c. As will be appreciated the description with respect to FIG. 1 represents a single fuel cell which may also be part of a stack of multiple layered fuel cells in a stack. The spring seals 16a are arranged adjacent to separator plates or anode plates 20. The spring seals 16c are similarly arranged adjacent to separator plates or cathode plates 22. As will be described, the spring seals 16a distribute fuel (i.e. $H_2$) from the anode plates 20 to the reactive faces of the MEAs 12. The spring seals 16c distribute oxidant gas (i.e. $O_2$) from the cathode plates 22 to the reactive faces of the MEAs 12. Each MEA 12 includes porous, gas permeable, electrically conductive sheets 26 pressed up against the electrode faces of MEAs 12 and serve as primary current collectors for the electrodes. A pair of adjacently disposed cooling plates 30 are arranged on a first side of the anode plates 20.

An oxidant gas such as oxygen or air is supplied to a surface of the cathode plates 22 of the fuel stack 10. The oxygen or air may be supplied from a storage tank (not shown) or preferably an oxygen tank may be eliminated and air can be supplied to the cathode plates 22 from ambient. Similarly, a fuel such as hydrogen is supplied to a surface of the anode plates 20 of the fuel stack 10. Hydrogen may also be supplied from a tank (not shown) or alternatively may be supplied from a reformer which catalytically generates hydrogen from methanol or a liquid hydrocarbon (e.g., gasoline). Exhaust plumbing (not shown) for both the $H_2$ and $O_2$ air sides of the MEAs 12 is also provided for removing $H_2$—depleted anode gas from the anode 20 and $O_2$—depleted cathode gas from the cathode 22. Likewise, coolant plumbing (not shown) is provided for supplying and exhausting liquid coolant to the anode and cathode plates 20, 22, as needed.

The anode and cathode plates 20, 22 are each a single plate member having a flow field 40, 42 formed therein as is known in the art. As presently preferred, the anode and cathode plates 20, 22 are metal sheets preferably stainless steel that may be formed by stamping, by photoetching (i.e., through a photolithographic mask) or any other conventional process for shaping sheet metal. One skilled in the art will recognize that other suitable materials and manufacturing processes may be utilized for the anode and cathode plates 20, 22.

Figure 2:
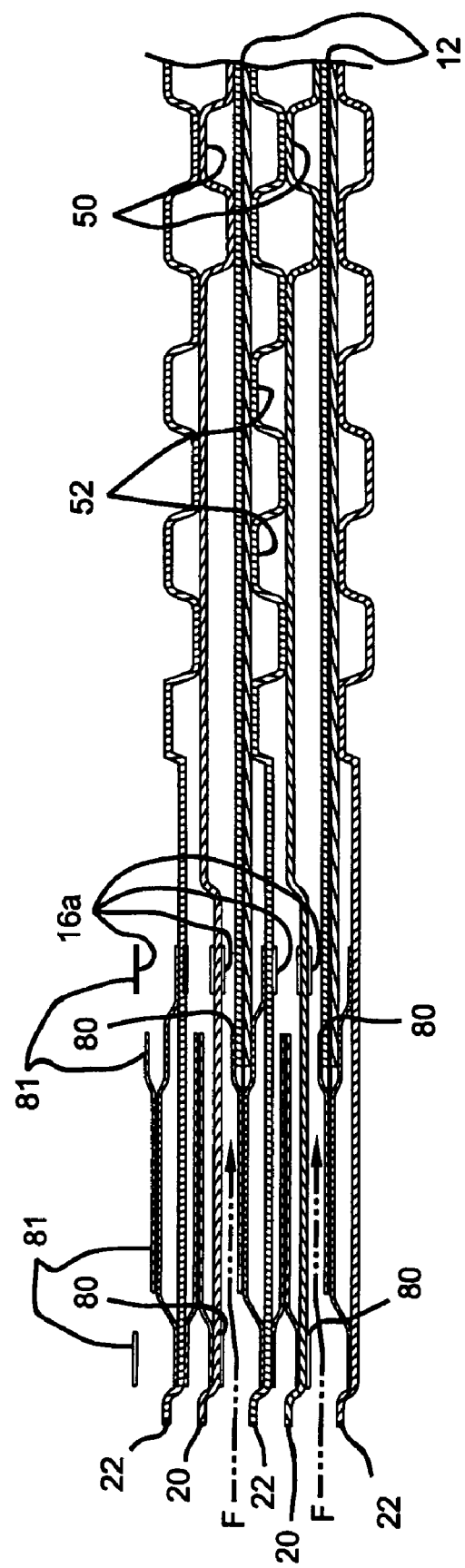
FIG. 2 is a cross section of the PEM fuel stack taken along line 2—2 of FIG. 1 showing the anode porting.
Figure 3:
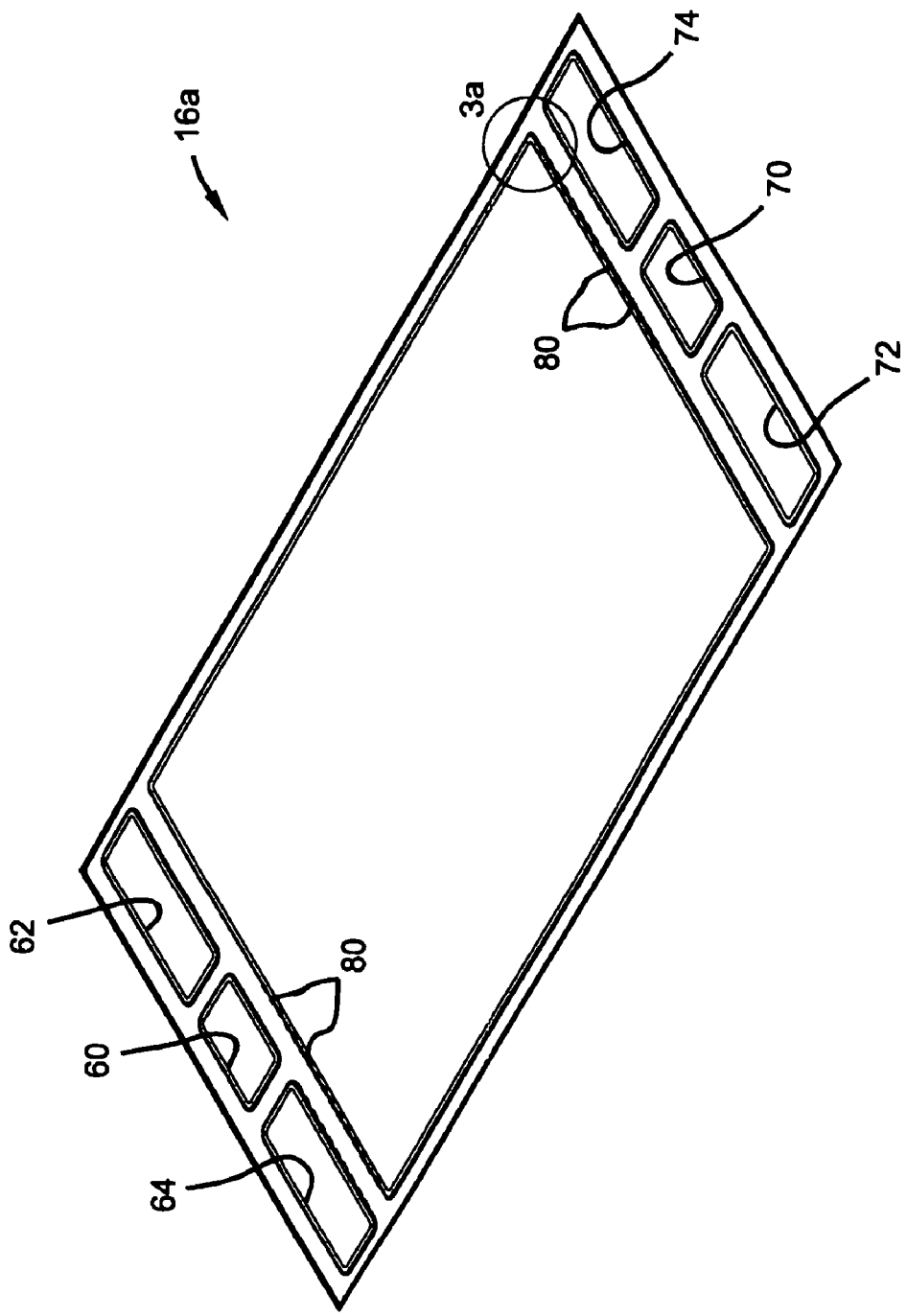
FIG. 3 is an isometric view of an exemplary spring seal used for communication with an anode plate in a PEM fuel cell.

With continued reference to FIG. 1 and further reference to FIGS. 2–4, the anode and cathode flow fields 40, 42 will be described in greater detail. It will be appreciated that additional cathode plates 22, related MEAs 12, and spring seal sets 16a, 16c have been added in FIGS. 2, 4 and 5 from that shown in FIG. 1 for illustrative purposes. The anode and cathode plates 20, 22 are formed such that the geometric configuration of the flow fields 40, 42, form a functional serpentine flow field on first sides thereof. More specifically, the anode and cathode plates 20, 22 are formed so as to provide a reactant gas flow field characterized by a plurality of lands 50, 52 that define a plurality of flow channels through which the reactant gases flow from an inlet plate margin 56 of the stack 10 to an exhaust plate margin 58 thereof. The direction of flow across each anode and cathode plate 20, 22 is generally from the inlet plate margin 56 through respective flow fields 40, 42 to the outlet plate margin 58.

A plurality of supply header apertures are formed near the outer edge of the inlet plate margin 56. Similarly, a plurality of exhaust header apertures are formed near the outer edge of the outlet plate margin 58. More specifically, the supply header aperture 60 communicates fuel ($H_2$) over the anode plates 20 through the flow channels 40 and out through exhaust header aperture 70. Supply header aperture 62 communicates oxidant ($O_2$) over the cathode plates 22 through the flow channels 42 and out exhaust header aperture 72. Finally, supply header aperture 64 communicates coolant over specified faces of the anode and cathode plate 20, 22 as needed and coolant leaves the stack at exhaust header aperture 74. It is appreciated that the spring seals 16 may be employed in a fuel cell stack having a single un-cooled separator plate or bipolar plate disposed between respective MEAs. The bipolar plate carries oxidant on a first surface and fuel over an opposite second surface. In this way, a fuel cell stack may be configured with un-cooled plates positioned at desired locations such as every other or every third cell for example.

With reference now to all the drawings, the spring seals 16a, 16c will be described in greater detail. The spring seals 16a, 16c provide the necessary passageways for the reactant gases from the supply header apertures 60, 62 of the inlet plate margin 56 to communicate with respective surfaces of the anode and cathode plates 20, 22. As such, complementary spring seals 16a, 16c are mirror images of each other while having specified porting arranged where needed. The spring seals 16a, 16c are preferably made of stamped metal sheets such as stainless steel. In one preferred method, the metal sheets are stamped to form apertures in predetermined locations. The sheets are subsequently laterally offset in specified areas such that the apertures form passages parallel to the MEAs 12. Each spring seal 16a, 16c is coated with an elastomeric material to increase sealing capacity while providing compliance. One skilled in the art will recognize that alternative materials may be employed while reaching similar results. As a result, the spring plates 16a, 16c have sufficient rigidity and depth to support the header portions 56, 58 of the stack 10 while also having compliant outer surfaces to form seals at the extended end portions.

With specific reference to FIGS. 1–3a, the fluid porting through the spring seals 16a from the supply header aperture 60 to the anode plates 20 will be described in greater detail. Fuel flows through supply header aperture 60 along a fluid communication path designated at Arrows F in FIG. 2. The fluid communication path is defined by spring plates 16a whereby flow is directed between anode plates 20 and MEAs 12. In this way, fuel may follow the serpentine flow path 40 defined by each anode plate 20 while reacting with MEAs 12 until it is communicated to port 70 of the exhaust header 58. As shown, strategically placed passages 80 are arranged in each spring plate 16a between laterally offset planar portions 81 such that fuel may flow through the header portion 56 to the desired anode plate 20.

With continued reference to FIG. 1 and further reference to FIG. 4, the fluid porting through the spring seals 16c from the supply header aperture 62 to the cathode plates 22 will be described in greater detail. Oxidant flows through supply header aperture 62 along a fluid communication path designated at Arrows O. The fluid communication path is defined by spring plates 16c whereby flow is directed between cathode plates 22 and MEAs 12. In this way, oxidant may follow the serpentine flow path 42 defined by each cathode plate 22 while reacting with MEAs 12 as it is communicated to the exhaust header 58. Again, strategically placed passages 82 are arranged in each spring plate 16c between laterally offset planar portions 83 such that oxidant may flow through the header portion 56 and over the desired cathode plate 22 until exiting at port 72 of exhaust header 58. It will be appreciated that porting through spring plates 16c is similar to that shown with respect to anode plates 16a in FIG. 3 except passages are aligned to communicate with apertures 62 and 72 rather than 64 and 74.

Figure 5:
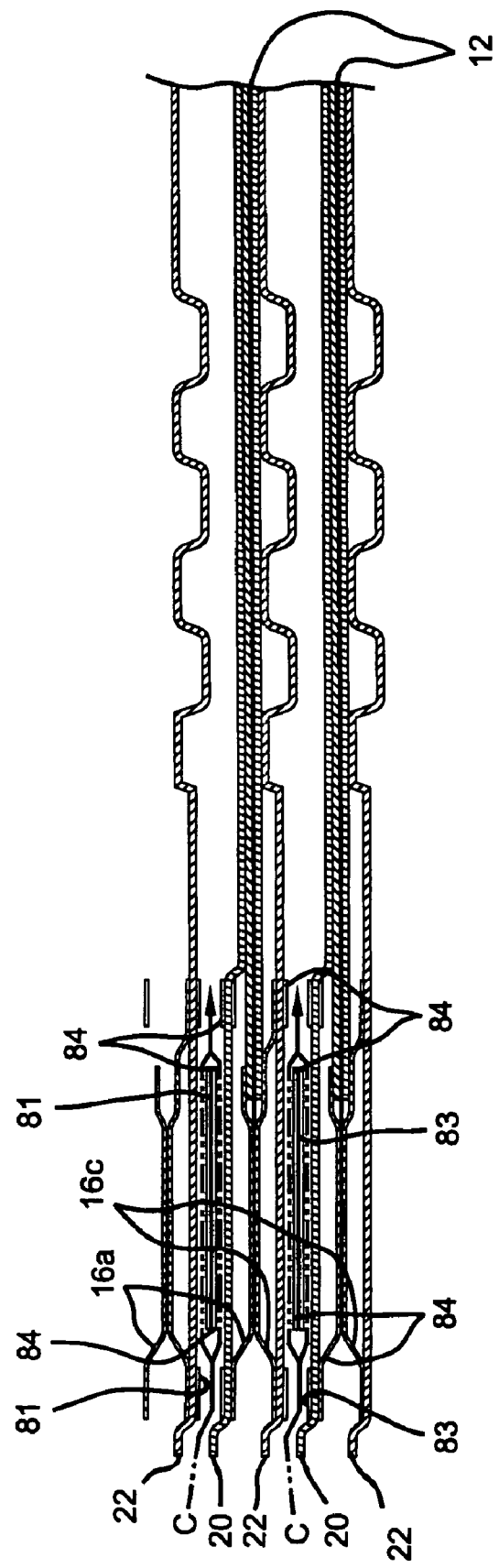
FIG. 5 is a cross section of the PEM fuel stack taken along line 5—5 of FIG. 1 showing the cooling porting.

Lastly, with continued reference to FIG. 1 and further reference to FIG. 5, the fluid porting of the coolant through the spring seals 16a, 16c from the supply header aperture 64 to the anode and cathode plates 20, 22 will be described in greater detail. Coolant enters the stack 10 through aperture 64. As shown, strategically placed passages 84 are arranged in each spring plate 16a, 16c between the laterally offset planar portions 81 and 83 such that coolant may flow (designated at Arrows C) through the header portion 56 to the desired anode and cathode plate 20, 22.

The supply or inlet flow of fluid into the fuel stack 10 has been described above in particular detail. One skilled in the art will readily recognize that the complementary spring seal configuration of the present invention incorporates a similar complementary spring seal configuration on the exhaust margin 58 of the fuel stack 10 for exhausting the gaseous reactants and coolant from the fuel stack 10. Thus, through the use of the spring seal configuration 16a, 16c above, the present invention is able to efficiently transport the gaseous reactants and coolant into, through and out of the fuel stack 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A PEM fuel cell comprising:
   a cathode plate for directing a first fluid along a surface thereof;
   an anode plate for directing a second fluid along a surface thereof;
   an MEA oriented in a first direction, said MEA having an anode face opposing said anode plate and a cathode face opposing said cathode plate;
   a plate margin having first and second header apertures oriented in a second direction, said second direction perpendicular to said first direction;
   a first seal disposed between said anode plate and said MEA, said first seal defining a first fluid communication path between said first header aperture and said anode plate; and
   a second seal disposed between said cathode plate and said MEA, said second seal defining a second fluid communication path between said second header aperture and said cathode plate, said first and second seals directing said first and second fluid to flow through respective passages formed through non-planar portions of said first and second seals.

2. The PEM fuel cell of claim 1 wherein said first and second seals are comprised of rigid metallic material.

3. The PEM fuel cell of claim 2 wherein said first and second seals are comprised of stamped metal.

4. The PEM fuel cell of claim 3 wherein said first and second seals are coated with elastomeric material.

5. The PEM fuel cell of claim 1 wherein said anode plate and said cathode plate are non-porous inboard of said first and second header apertures of said plate margin.

6. The PEM fuel cell of claim 1 wherein said first and second seals include an intermediate portion oriented parallel with said first direction and adjacent to said MEA and outer end portions oriented parallel with said first direction and offset from said intermediate portion.

7. The PEM fuel cell of claim 6 wherein said first and second seals further include ramped portions connecting said intermediate portion with said outer end portions, said ramped portion having said passages formed thereon.

8. A seal arrangement for directing fluid flow from a header of a PEM fuel cell to an appropriate MEA face bounded between an anode and cathode plate, said seal arrangement comprising:
   a first seal disposed between the anode plate and the MEA, said first seal defining a first fluid communication path between a first fluid supply aperture in the header and the anode plate; and
   a second seal disposed between the cathode plate and the MEA, said second seal defining a second fluid communication path between a second fluid supply aperture in the header and the cathode plate, said first and second seals directing said first and second fluid to flow through respective passages thereon in a direction parallel to a surface of said MEA;
   wherein said first and second seals are comprised of rigid metallic material coated with elastomeric material;
   wherein said first and second seals are comprised of stamped metal;
   wherein said first and second seals include an intermediate portion oriented parallel with and adjacent to the surface of the MEA and outer end portions oriented parallel with the surface of the MEA and offset from said intermediate portion; and
   wherein said first and second seals further include ramped portions connecting said intermediate portion with said outer end portions, said ramped portion having said passages formed thereon.

9. A PEM fuel cell comprising:
- a separator plate for directing a first fluid along a first surface thereof and a second fluid along an opposite second surface thereof;
- a first MEA oriented in a first direction, said first MEA having an anode face opposing said first surface of said separator plate;
- a plate margin having a first header aperture oriented in a second direction, said second direction perpendicular to said first direction; and
- a first seal disposed between said separator plate and said first MEA, said first seal defining a first fluid communication path between said first header aperture and said first surface of said separator plate, said first seal allowing said first fluid to flow through a passage formed through non-planar portions of said first seal.

10. The separator plate of claim 9, further comprising:
- a second MEA oriented in said first direction, said second MEA having a cathode face opposing said second surface of said separator plate;
- a second header aperture oriented on said plate margin in said second direction; and
- a second seal disposed between said separator plate and said second MEA, said second seal defining a second two-dimensional fluid communication path between said second header aperture and said second surface of said separator plate, said second seal allowing said second fluid to flow through a passage formed through non-planar portions of said second seal.

11. The PEM fuel cell of claim 10 wherein said first and second seals are comprised of rigid metallic material.

12. The PEM fuel cell of claim 11 wherein said first and second seals are comprised of stamped metal.

13. The PEM fuel cell of claim 12 wherein said first and second seals are coated with elastomeric material.

14. The PEM fuel cell of claim 10 wherein said first and second seals include an intermediate portion oriented parallel with said first direction and adjacent to said first and second MEAs respectively and outer end portions oriented parallel with said first direction and offset from said intermediate portion.

15. The PEM fuel cell of claim 14 wherein said first and second seals further include ramped portions connecting said intermediate portion with said outer end portions, said ramped portions having said passages respectively formed thereon.

16. A seal arrangement for directing fluid flow from a header of a PEM fuel cell to an appropriate MEA face bounded between an anode and cathode plate, said seal arrangement comprising:
- a first seal disposed between the anode plate and the MEA, said first seal defining a first fluid communication path between a first fluid supply aperture in the header and the anode plate; and
- a second seal disposed between the cathode plate and the MEA, said second seal defining a second fluid communication path between a second fluid supply aperture in the header and the cathode plate, said first and second seals directing said first and second fluid to flow through respective passages thereon in a direction parallel to a surface of said MEA;
- wherein said first and second seals include an intermediate portion oriented parallel with and adjacent to the surface of the MEA, outer end portions oriented parallel with the surface of the MEA and offset from said intermediate portion, and ramped portions connecting said intermediate portion with said outer end portions, said ramped portions having said passages formed thereon.

* * * * *